United States Patent
Mori et al.

[11] Patent Number: 5,933,149
[45] Date of Patent: Aug. 3, 1999

[54] INFORMATION INPUTTING METHOD AND DEVICE

[75] Inventors: Shigeki Mori, Koshigaya; Atsushi Tanaka, Yamato, both of Japan

[73] Assignee: Canon Kabushiki Kaisha, Tokyo, Japan

[21] Appl. No.: 08/838,129

[22] Filed: Apr. 15, 1997

[30] Foreign Application Priority Data

Apr. 16, 1996 [JP] Japan ................................ 8-094121

[51] Int. Cl.⁶ .................................................. G06T 5/30
[52] U.S. Cl. ..................... 345/442; 345/443; 382/197; 382/202; 382/241; 382/242
[58] Field of Search ................................. 345/358, 442, 345/443; 382/197, 199, 202, 241, 242

[56] References Cited

U.S. PATENT DOCUMENTS

| | | | |
|---|---|---|---|
| 4,513,444 | 4/1985 | Okai et al. | 382/242 |
| 4,550,438 | 10/1985 | Convis et al. | 382/242 |
| 4,669,097 | 5/1987 | Bristol | 375/240 |
| 5,539,678 | 7/1996 | Tanaka et al. | 364/561 |
| 5,668,894 | 9/1997 | Hamano et al. | 382/242 |
| 5,742,751 | 4/1998 | Imanishi et al. | 345/442 |
| 5,760,787 | 6/1998 | Piper | 345/442 |

*Primary Examiner*—Mark R. Powell
*Assistant Examiner*—Vincent E. Kovalick
*Attorney, Agent, or Firm*—Fitzpatrick Cella Harper & Scinto

[57] ABSTRACT

An information inputting method, as well as an information inputting device, extracts effective characteristic points from inputted stroke information and outputs coordinate information relating to the extracted characteristic points. First point coordinates values are input in a sampling cycle at a predetermined sampling rate. Second point coordinates values are input in the sampling cycle delayed a predetermined time behind the inputting of the first point coordinate values. A first vector is formed based on the first and second point coordinate values. First and second point coordinate values are also input in the subsequent sampling cycle, and a second vector is determined based thereon. The first point coordinate values inputted earlier are selected when these values cause the angle formed between the first and second vectors to exceed a predetermined threshold value. Information concerning the selected first point coordinates values are output to, for example, a host device.

22 Claims, 15 Drawing Sheets

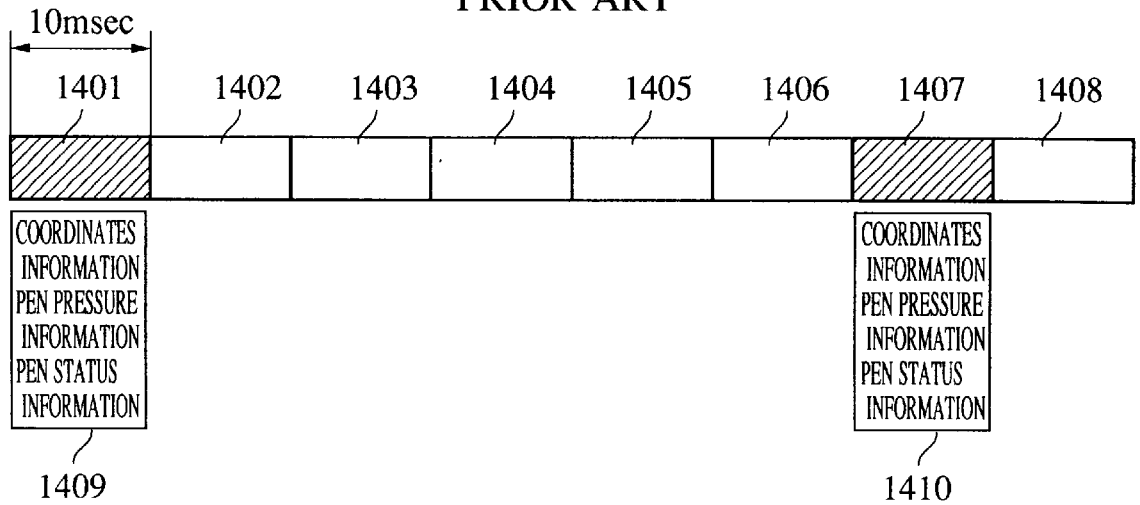
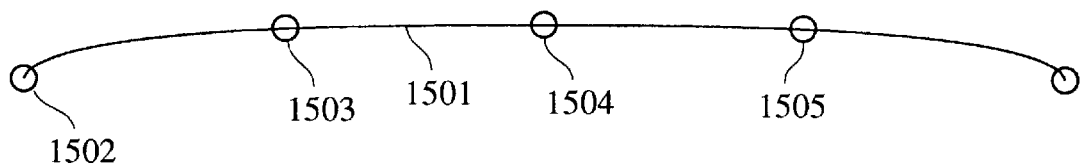
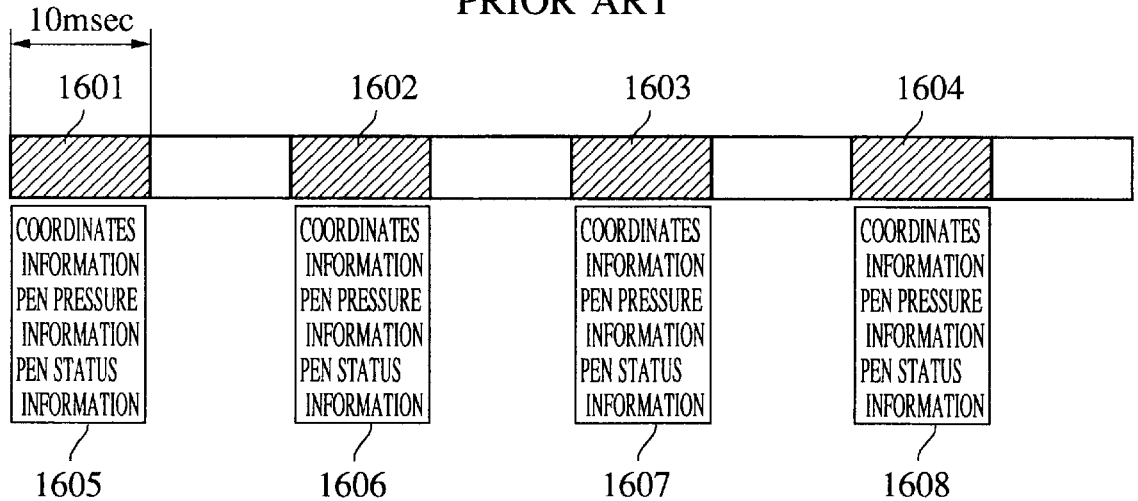

INFORMATION INPUTTING METHOD AND DEVICE

BACKGROUND OF THE INVENTION

1. Field of the Invention

The present invention relates to a method of and a device for inputting information, particularly coordinates information of a predetermined stroke.

2. Description of the Related Art

Hitherto, transmission of coordinates information from a coordinates input device to a host device is conducted at a predetermined sampling rate, e.g., 100 points per second. Consequently, there are some cases where the information is inadequate in terms of quantity or quality from the view point of processing of such information.

For instance, pieces of information regarding a multiplicity of points as indicated in FIG. 1 by points 1102 to 1109 are transmitted even for a locus of writing that is a simple straight line. More specifically, coordinates information and associated information are transmitted for every 10 msec.

Therefore, it has been a common technique that a host device which processes these types of information generates, for example through a characteristic point extracting device incorporated therein, thinned coordinate information composed solely of characteristic points, for the purpose of processing such information.

Inputting of such a large quantity of information also places a burden on the information receiving section of the host device.

In order to overcome this problem, coordinate input devices have been proposed of the type in which a detected series of coordinate information is examined in terms of the angular displacement between two consecutive coordinate values or the number of coordinate points which have been thinned out consecutively. When a threshold value of the angular displacement or the number of coordinate points has exceeded a predetermined threshold, the coordinate values of the point at which the threshold is exceeded are included as characteristic point coordinate values in the coordinates information series to be transmitted to the host device.

FIGS. 3 to 6 illustrate the manner in which information is output from this type of coordinate input device. For instance, when the locus of writing is substantially straight as shown in FIG. 3, coordinates data of only the points 1302 and 1303, with the intervening point thinned out, are transmitted as characteristic point data. FIG. 4 illustrates this pattern of information output. The information output interval is 60 msec as will be seen from indications of outputs 1409 and 1410.

When the writing locus is curvilinear as shown in FIG. 5, the characteristic points are extracted at a slightly smaller pitch of thinning out than that in FIG. 3. FIG. 6 shows this pattern of information output. Coordinate data are output as indicated by 1605, 1606, 1607 and 1608. The information output interval is 20 m second in this case.

The characteristic point extracting operation as described above, however, encounters with the following problem. Namely, the optimum value of the threshold for extracting the characteristic points varies depending on factors such as the size of the object entering the coordinate input device, the character, pattern or the like, curvatures of curves which constitute such object, velocity of writing, and so forth. Consequently, the host device cannot always receive a coordinate information series which has been thinned out to present only the characteristic points which are optimum for processing by the host device.

When a pattern or the like is input by free-hand writing, the velocity of the writing instrument, e.g., a pen, necessarily occurs at certain points. If such points could be extracted as characteristic points, valuable and useful information for on-line hand-writing recognition or pen-input gesture command recognition would be obtained. With the known technique described above, however, it is impossible to extract such characteristic points, so that such valuable and useful information cannot be obtained.

SUMMARY OF THE INVENTION

Accordingly, it is an object of the present invention to provide an information inputting method, as well as an information inputting device, which effectively extracts useful characteristic points from input stroke information and outputs coordinate information of such characteristic points.

To this end, according to one aspect of the present invention, there is provided an information inputting method, including: a first inputting step for inputting first point coordinates values at a predetermined sampling rate; a second inputting step executed delayed a predetermined time behind the execution of the first inputting step, so as to input second point coordinates values; a selecting step for determining a first vector based on the first point coordinates values inputted in the first inputting step and the second point coordinates values inputted in the second inputting step, determining a second vector based on the first and second point coordinates values inputted in the first and second inputting steps of a subsequent sampling cycle, and selecting the first point coordinates values which have been inputted in the first inputting step that cause the angle formed between the first and second vectors to exceed a predetermined threshold value; and an outputting step for outputting information concerning the first point coordinates values selected in the selecting step.

The above and other objects, features and advantages of the present invention will become clear from the following description when the same is read in conjunction with the accompanying drawings.

BRIEF DESCRIPTION OF THE DRAWINGS

FIG. 4 is an illustration of the details of the output information shown in FIG. 3.

FIG. 5 is an illustration of the manner in which information is output from the conventional coordinates input device when the locus of writing input is curvilinear.

FIG. 6 is an illustration of the details of the output information shown in FIG. 5.

DESCRIPTION OF THE PREFERRED EMBODIMENTS

In advance of the detailed description of the embodiments, a brief description will be given of the outline of critical or essential features of the information inputting method and device which embody the present invention.

According to the information inputting method and device of the present invention, characteristic points are selected based on an amount or magnitude of a value which represents the relationship between contiguous quasi-tangential vectors determined on coordinate values of over-sampled points, and information concerning the thus selected characteristic point is outputted from the information inputting device.

A detailed description will now be given of the preferred embodiments of the information inputting method and device of the present invention.

First Embodiment

Figure 1:
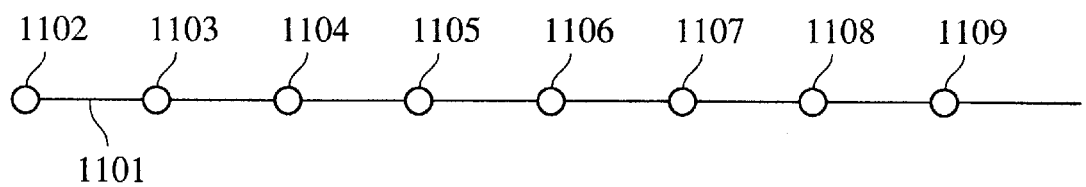
FIG. 1 is an illustration of coordinate points which are output from a conventional information input device.
Figure 2:
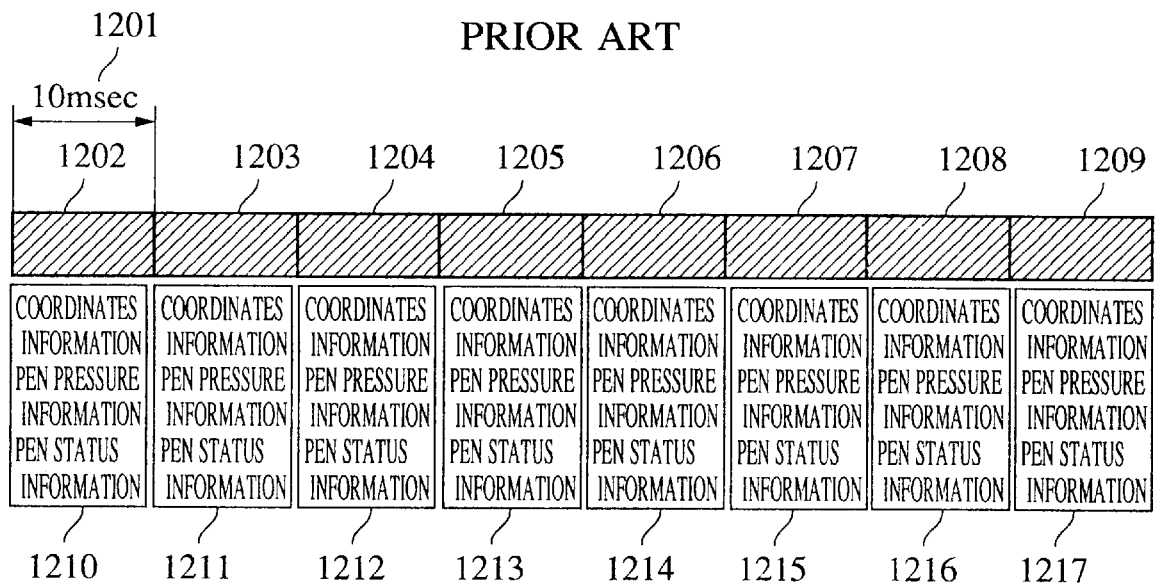
FIG. 2 is an illustration of the details of coordinate points output from the conventional information input device.
Figure 3:
FIG. 3 is an illustration of the manner in which information is output from the conventional coordinates input device when the locus of writing input is substantially straight.
Figure 7:
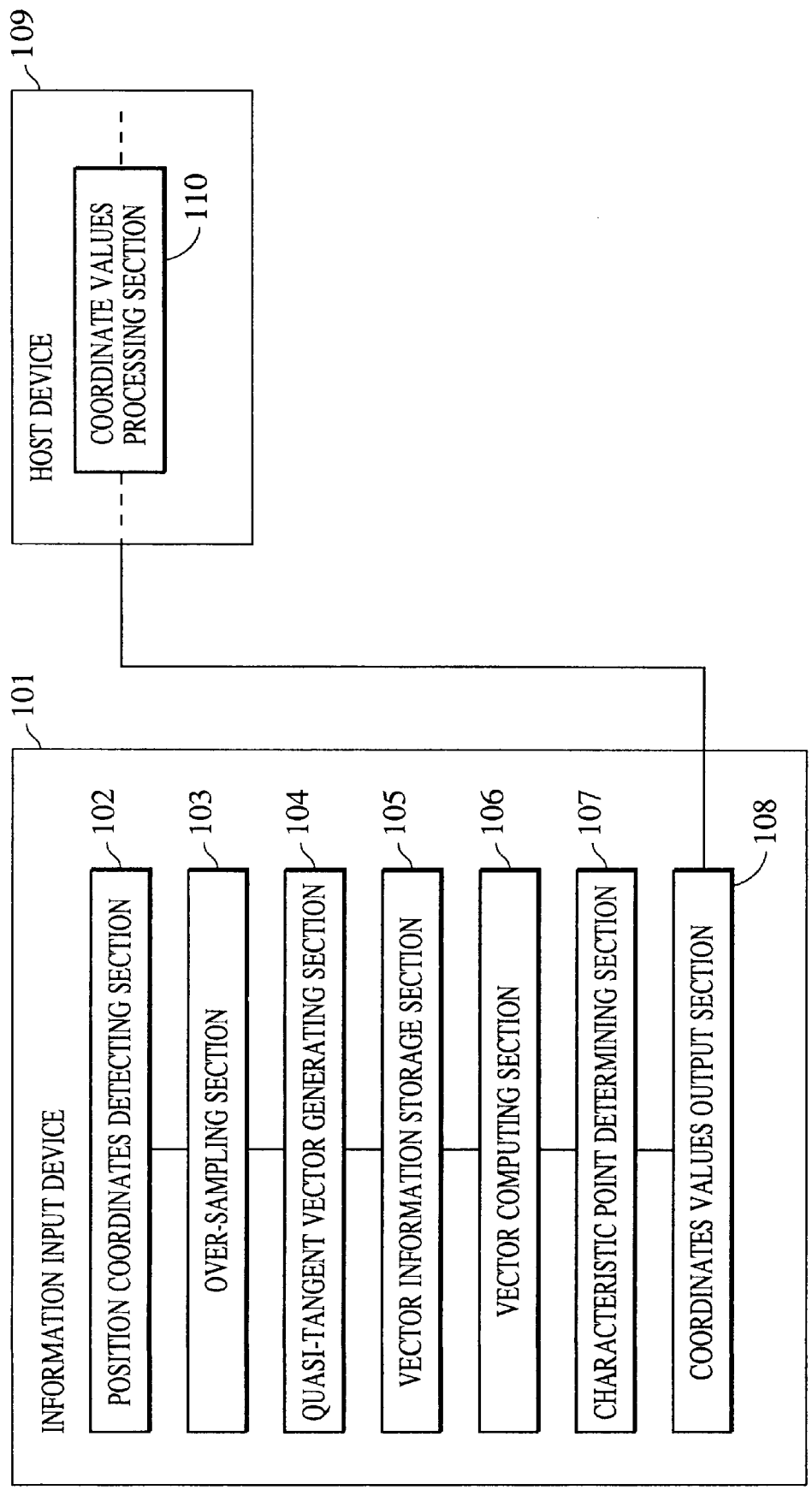
FIG. 7 is a block diagram showing the relationship between a host device and the component sections of an information inputting device in accordance with the first embodiment of the present invention.

FIG. 7 shows the structures of an information inputting device 101 of the first embodiment, together with the structure of a host device 109, as well as the relationship between the information inputting device 101 and the host device 109.

The information inputting device 101 includes a position coordinates detecting section 102 which performs the ordinary operation of detecting coordinate values of a point, and an over-sampling section 103 which detects coordinate values of a written locus at a moment which lags a predetermined time from the moment at which the coordinates values are detected by the position coordinates detecting section 102.

The information inputting device 101 also includes a quasi-tangential vector generating section 104 which generates vector information based on the two sets of coordinate values: namely, the coordinate values detected by the position coordinates detecting section 102 and the coordinate values detected by the over-sampling section 103.

Numeral 105 denotes a vector information storage section which stores the above-mentioned vector information which is to be later subjected to a comparison.

The information inputting device 101 further includes a vector computing section 106 which computes data to be used in the above-mentioned comparison, and a characteristic point determining section 107 which determines, based on the value computed by the vector computing section 106, whether a point in question is a characteristic point.

Numeral 108 designates a coordinates values output section, through which information of coordinate values of a point determined as being a characteristic point is outputted from the information inputting device.

The host device 109 performs various kinds of processing based on the coordinates information transmitted from the information inputting device 101. To this end, the host device 109 has a coordinates values processing section 110 which performs various kinds of processing on coordinate values contained in the coordinates information including those of characteristic points.

The position coordinates detecting section 102 and the host device 109 are well known in the art and, hence, are not described in detail.

Figure 8:
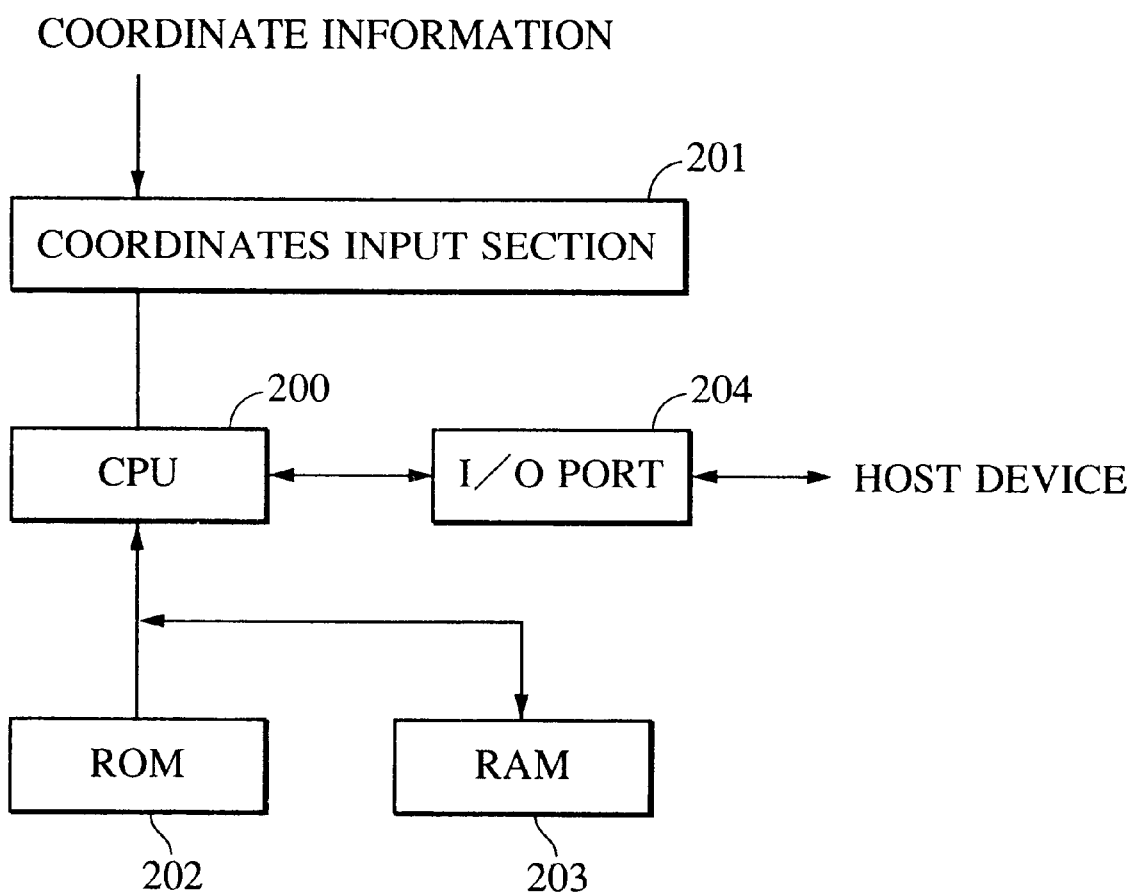
FIG. 8 is a block diagram of the basic hardware structure of the information inputting device embodying the present invention.

A description will now be given of an example of the hardware structure of information inputting device 101 with specific reference to FIG. 8. The hardware includes a coordinates input section 201 which has a construction similar to that of a coordinates input section of an ordinary digitizer. The coordinates input section 201 performs sampling of coordinates data at a predetermined interval and converts the sampled coordinates data into coordinate values. These coordinate values are delivered to a CPU 200 which also is a component of the information inputting device 101.

The CPU 200 performs overall control of the information inputting device 101, in accordance with control programs stored in a ROM 202.

The coordinate inputting device 101 also has a RAM 203. A storage area for storing data delivered from the coordinates input section 201 and a working area for enabling processing performed by the CPU 200 are assigned in the RAM 203.

An I/O port 204 performs control of transmission of the results of the processing performed by the CPU 200 to the host device 109, as well as control of entry of commands and data from the host device 109 to the information inputting device 101.

The content of the processing to be performed by each processing section of the information inputting device 101 shown in FIG. 7 is in a software program stored in the ROM 202.

Figure 9:
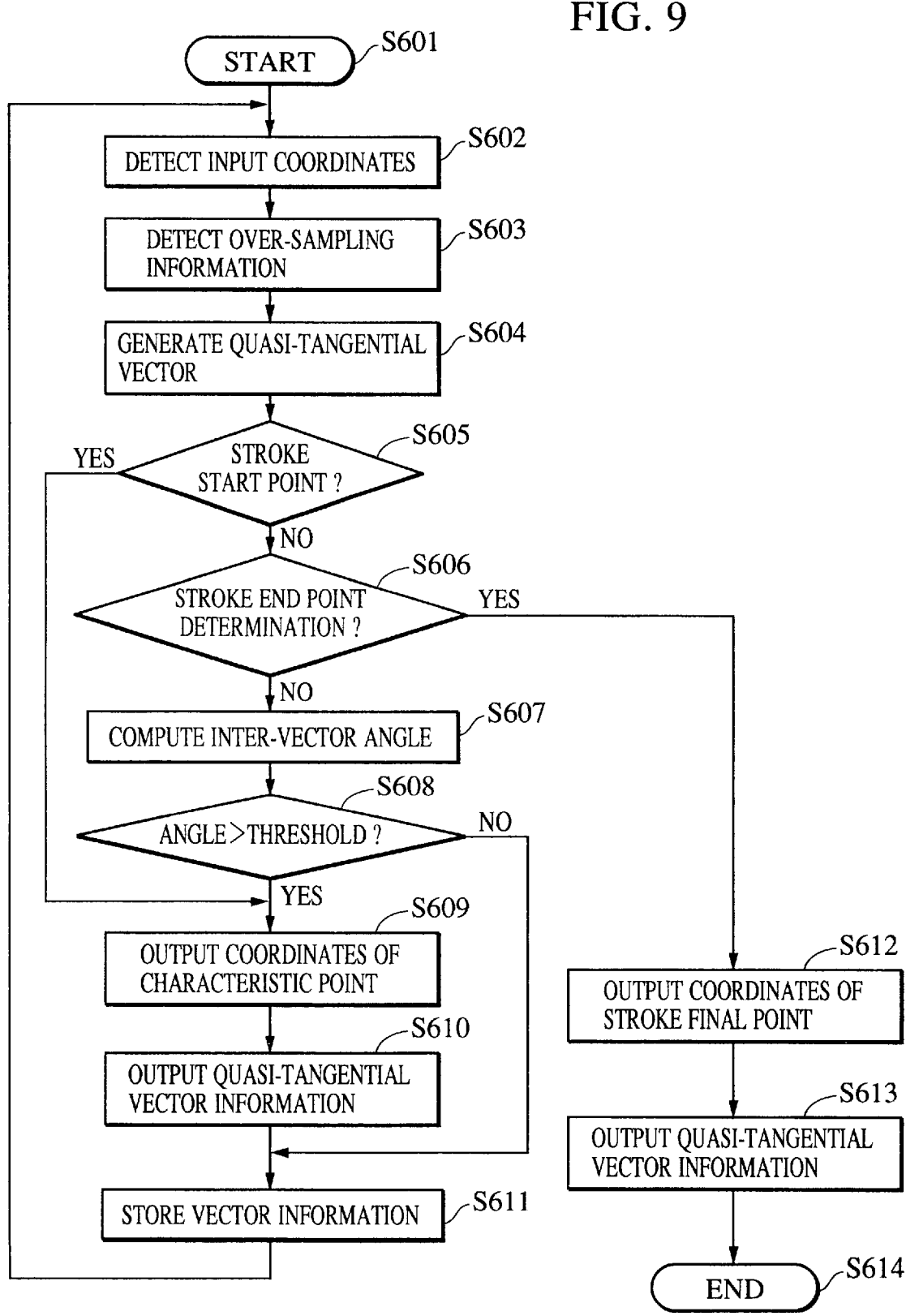
FIG. 9 is a flow chart showing a process performed by the information inputting device in accordance with the first embodiment of the present invention.

FIG. 9 is a flow chart showing the process performed by the information inputting device 101 of the described embodiment.

The processing program corresponding to this flow chart is stored in the ROM 202 and is executed by the CPU 202.

Step S601 indicates the entry point of a stroke locus which is inputted by writing to the information inputting device. Coordinates values of characteristic points on the stroke locus thus inputted are produced and outputted through a series of steps of the process, as follows.

Step S602 picks up coordinate values from the coordinate input section 201.

Step S603 picks up over-sampling information (coordinates values) from the coordinates input section 201.

Step S604 generates a quasi-tangential vector, based on the two sets of coordinate values obtained in Steps S602 and S603.

Step S605 determines whether or not the point represented by the coordinates values as detected in Step S602 is a starting point of a stroke locus. If the answer is YES, i.e., if this point is the starting point, the process skips to Step S609, whereas, when the answer is NO, the process proceeds to Step S606.

Step S606 determines whether or not the point represented by the coordinate values as detected in Step S602 is the final point of the stroke locus. If the answer is NO, i.e., when this point is not the final point, the process proceeds to Step S607, whereas, if the answer is YES, the process skips to Step S612.

Step S607 computes the angle formed between the quasi-tangential vector generated in Step S604 and the quasi-tangential vector which was generated in the preceding sampling cycle.

Step S608 compares the angle computed in Step S607 with a predetermined threshold angle. If the computed angle is greater than the threshold angle, it is determined that the sampled portion of the locus contains a characteristic point at which the locus makes an abrupt change in the direction. In such a case, the process proceeds to Step S609, otherwise, the process skips to S611 upon judging that no characteristic point is contained.

Step S609 delivers, through the I/O port 204, the coordinates values of the point determined as being the characteristic point to the host device 109.

Step S610 delivers the quasi-tangential vector information to the host device 109 via the I/O port 204.

Step S611 stores the current vector information in the RAM 203. The process then returns to Step S602 so as to repeat the described processing.

In Steps S612 and S613, the coordinate values of the final point of the stroke and the quasi-tangential vector information are delivered to the host device 109 through the I/O port 204.

Figure 10:
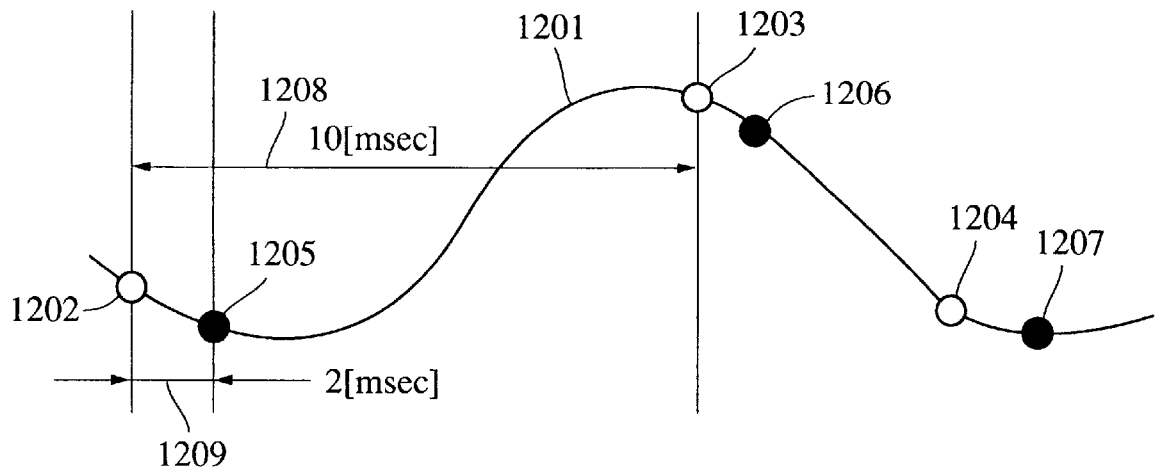
FIG. 10 is an illustration of an over-sampling processing operation performed by the information inputting device in accordance with the first embodiment of the present invention.

FIG. 10 illustrates the writing locus inputted to the information inputting device 101 by hand writing.

A curved line 1201 shows the locus of an input instrument such as a pen as the hand-writing instrument used in the inputting of the information. Points 1202, 1203 and 1204 on the locus 1201 indicate the coordinates values which are detected by the coordinates input device 201 at a predetermined period of sampling which in this case is assumed to be 10 msec.

Points 205, 206 and 207 which also are located on the locus 1202 indicate the coordinate values detected through over-sampling conducted 2 msec after the moments of detection of the aforementioned points 1202, 1203 and 1204 performed by the coordinates input section 201.

Figure 11:
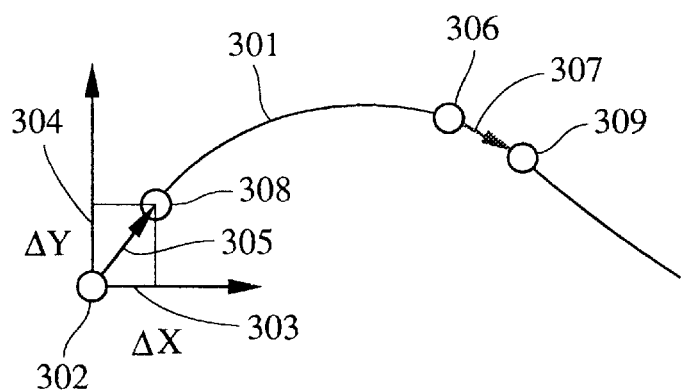
FIG. 11 is an illustration explanatory of the processing operation in accordance with the first embodiment.

FIG. 11 is illustrates the processing operation performed in this embodiment of the present invention.

The locus of the hand-written information inputted to the information inputting device 101 is denoted by 301.

Points 302 and 306 located on the locus 301 indicate the coordinates values detected by the coordinates input section 201 through a sampling conducted at a predetermined sampling period, while points 308 and 309 located on the locus 301 indicate the coordinates values detected in the over-sampling operation performed in Step S603 of the process shown in FIG. 9.

Numeral 305 indicates vector information determined by the coordinates points 302 and 308, while 307 denotes vector information which is determined by the coordinates points 306 and 309.

A description will now be given by way of example as to the manner in which the stroke information as shown in FIG. 11 is processed in accordance with the flow shown in FIG. 9.

The series of steps starting from Step S601 is commenced when the entry of the stroke locus 301 of FIG. 11 to the information inputting device 101 of this embodiment is started.

Step S602 detects the coordinates values of the first point 302 shown in FIG. 11. Step S603 detects the coordinates values of the point 308 which immediately follows the point 302. In Step S604, the vector 305 is generated based on the coordinates values of these two points 302 and 308.

Step S605 determines whether the first point 302 is the starting point of the stroke. Since in this case the point 302 is the starting point of the stroke, the process skips to Step S609 so that the information inputting device 101 informs the host device 109 of the coordinates values of this point as the starting point which is one of characteristic points. The process then proceeds to Step S610.

In Step S610, the vector information 305 generated in Step S604 is outputted from the information inputting device 101 to the host device 109, in terms of the coordinates values of the starting point 302 and X- and Y-components along the X-axis 303 and Y-axis 304 assumed on the information inputting device 101.

Step S611 stores the vector information delivered in Step S610. The process then returns to Step S602, so that the next cycle of sampling is started.

Step S602 detects the coordinates values of the next point 306 on the locus, and Step S603 detects the coordinates values of the point 309.

Step S604 generates the vector 307 based on the coordinates values of the points 306 and 309. The process then proceeds to Step S605 which executes the determination as to the stroke start point and further to Step S606 which executes the determination as to the stroke final point.

In this case, since the point 306 is not the final point, the process proceeds to Step S607 which computes the angle formed between the vectors which are respectively contained in the information 305 which has been stored since Step S611 and the vector information 307 newly generated in Step S604.

Figure 12:
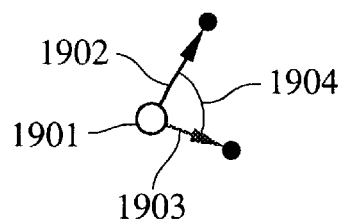
FIG. 12 is an illustration explanatory of a processing operation performed in the first embodiment, based on the angle formed between two contiguous quasi-tangential vectors.

FIG. 12 illustrates the manner in which the angle between these two vectors is computed. The angle is indicated by 1904, while two pieces of vector information are designated at 1902 and 1903.

In Step S608, a determination is conducted as to whether the point 306 is to be extracted as a characteristic point, based on the result of the computation performed in Step S607 and a predetermined threshold value.

More specifically, when the angle computed in Step S607 is greater than the threshold value, the point 306 is determined to be a characteristic point, so that the coordinates information 306 and the vector information 307 are respectively delivered in Steps S609 and S610.

Conversely, when the angle computed in Step S607 is smaller than the threshold value, the point 306 is not regarded as being a characteristic point. In this case, the process returns to Step S602 after storing the vector information 307 in Step S611.

The described operation is thus repeated cyclically, and, whenever a characteristic point is detected in Step S608, the coordinates values and vector information concerning such a characteristic point are outputted from the information inputting device.

When the coordinates values detected in Step S602 are the coordinates values of the final point of the stroke, Step S606 determines this point to be the final point which is a specific form of the characteristic point. The coordinates values and the vector information regarding this point are therefore outputted in Steps S612 and S613.

As will be understood from the foregoing description, in the described embodiment of the present invention, a characteristic point can be detected based on coordinates series information of only two successive points. This should be contrasted to the conventional method of detecting a characteristic point which relies upon amount of change in the angle detected based on coordinate series information of at least three consecutive points. In addition, the over-sampling information, which is obtained from a point in the close proximity of a detected point, also provides angle information indicative of the direction of the locus, so that direction or angle of the locus can be determined with a higher degree of fidelity to the actual direction of the locus.

Figure 13:
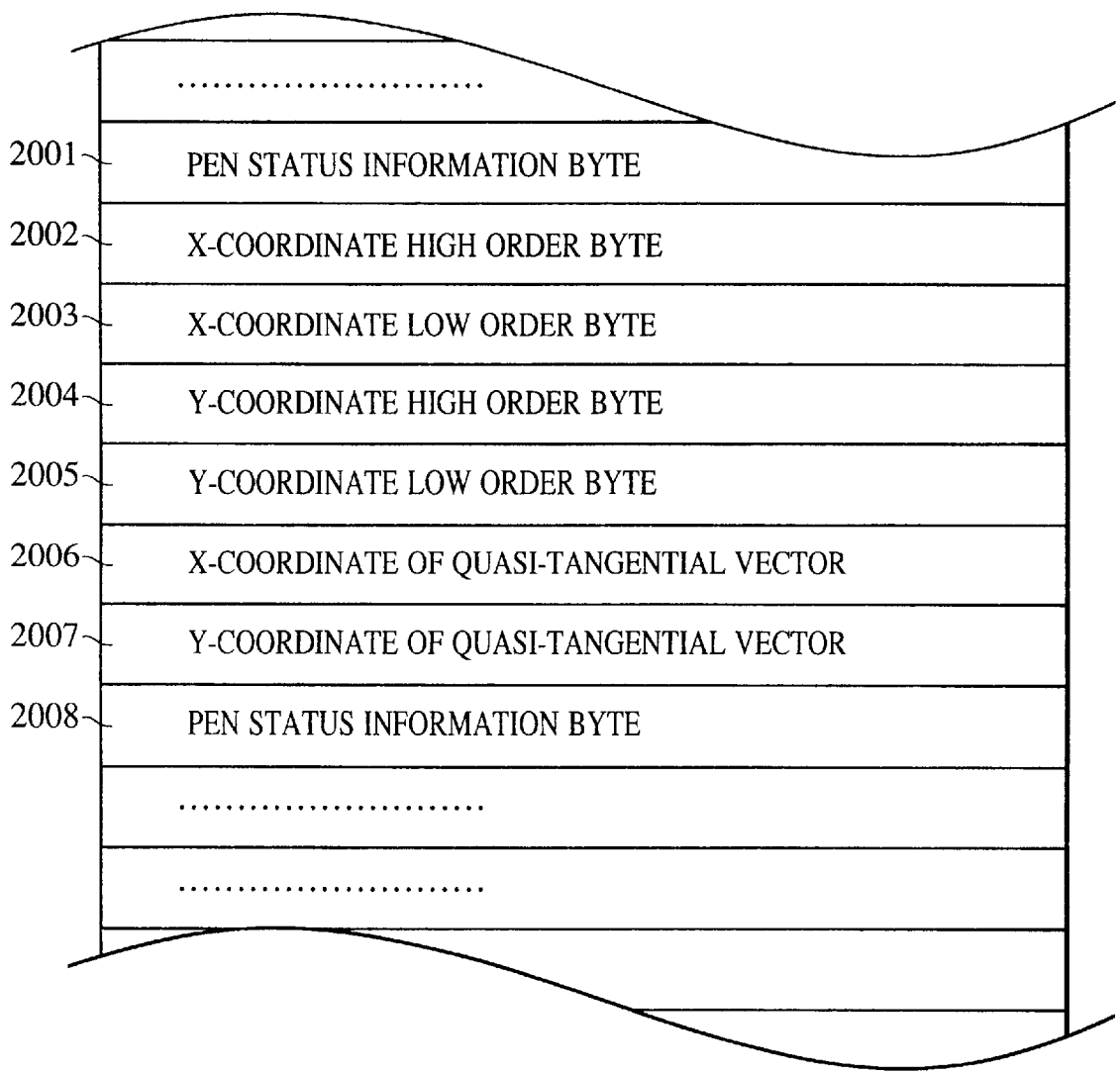
FIG. 13 is an illustration of an example of the structure of output information in regard to a characteristic point selected in accordance with the first embodiment of the present invention.

Furthermore, an additional value is imparted to the processing of the locus information performed by the host device, when the quasi-tangential vector information, which has been obtained from the coordinate values detected in the over-sampling operation, and is delivered from the information inputting device 101 in addition to the coordinates information, as shown in FIG. 13.

Figure 14:
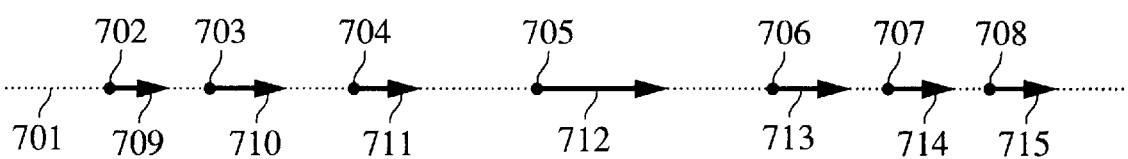
FIG. 14 is an illustration of a straight-line locus which has been inputted to an information inputting device, showing also vector information at detected points.

Referring to FIG. 14, a straight locus 701 has been input to the information inputting device 101. Numerals 702 to 708 denote the points detected on the straight locus. 709 to 715 denote the vector information which have been generated in the vector generating step of the process described above.

Figure 15:
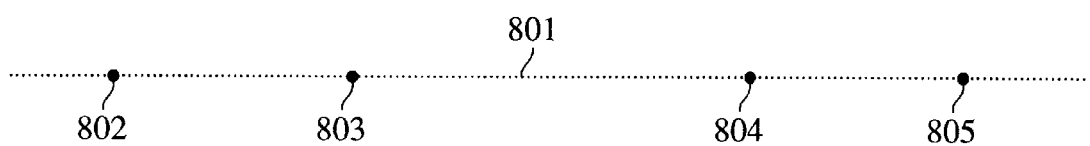
FIG. 15 is an illustration of an example of characteristic points as obtained in a conventional information inputting device.

FIG. 15 shows, by way of example, characteristic points which have been extracted by a conventional characteristic point extracting means from the straight locus information. When a thinning out operation is conducted, only the starting point and finishing point are extracted from the straight locus information which is indicated by numeral 801. Alternatively, coordinate information is obtained on a plurality of points which are suitably spaced along the straight locus 801 are extracted.

When this conventional extracting method is used, all that the host device can reproduce from the coordinate information on the points 802 to 805 is the fact that the locus is straight, even when the pieces of vector information denoted by 709 to 715 are added to respective coordinates information 802 to 805.

Figure 16:
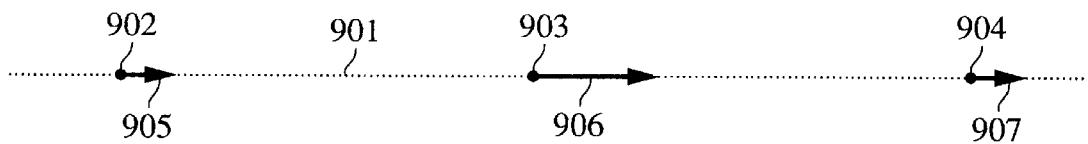
FIG. 16 is an illustration of an example of characteristic points as obtained in an information inputting device embodying the present invention.

In contrast, the characteristic point extracting method in accordance with the present invention can produce information concerning an abrupt change in the writing velocity at which the straight locus 701 shown in FIG. 14 is formed. Namely, it is possible to obtain coordinate information for each of the points 902 to 904 shown in FIG. 16, as well as vector information indicated by 905 to 907 from the locus 701.

Thus, the described embodiment makes it possible to deliver to the host device a more vivid locus information, through detection of points at which the writing velocity is significantly changed during the writing on the information inputting device 101.

In addition, it is possible to easily generate a cubic spline curve by the host device 109, based on the coordinates information and tangent vectors, by positively using the quasi-tangential vectors as the tangent vectors.

In the generation of the cubic spline curve, it is not necessary to determine tangent vectors through computation on each coordinate point. Namely, it is possible to substitute, directly in a cubic spline function, a value obtained by multiplying the preceding tangent vector information with a suitable constant. It is therefore possible to generate the curve at a high speed in the host device 109.

Second Embodiment

In the first embodiment as described above, the detection of a characteristic point using quasi-tangential vectors relies upon the angle formed between the two successive pieces of vector information. According to the invention, however, the extraction of a characteristic point can be conducted based on the difference between the scalar amounts of two successive pieces of vector information, as in the second embodiment which will now be described.

Figure 17:
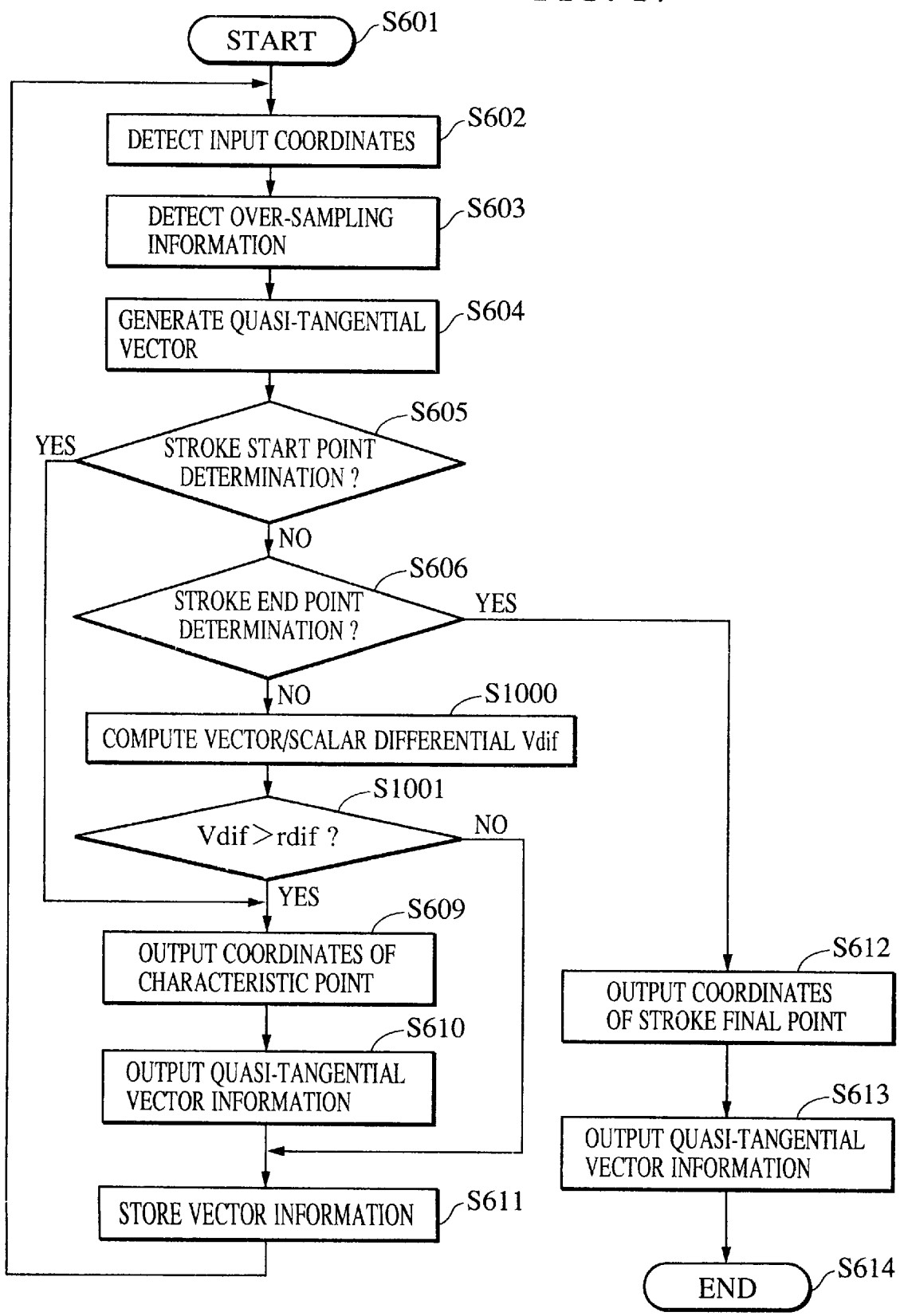
FIG. 17 is a flow chart showing a processing operation performed by an information inputting device in accordance with the second embodiment of the present invention.

FIG. 17 is a flow chart showing the process performed in accordance with the second embodiment. The process shown in FIG. 17 includes steps which are equivalent to those of the process shown in FIG. 9. These equivalent steps, therefore, are denoted by the same reference numerals as those in FIG. 9, and the following description is focused only on the steps which are different from those in the process shown in FIG. 9.

Briefly, the process shown in FIG. 17 is distinguished from that shown in FIG. 9 in that Steps S607 and S608 in the process of FIG. 9 are replaced by Steps S1000 and S1001.

Step S1000 determines the scalar amount (i.e., absolute value) of the quasi-tangential vector generated in Step S604, as well as the scalar amount (i.e., absolute value) of the quasi-tangential vector which was generated immediately before this quasi-tangential vector. Step 1000 then computes the differential $V_{dif}$ between these scalar amounts. When the differential $V_{dif}$ computed for a certain point exceeds a predetermined threshold $r_{dif}$, this point is determined as being a characteristic point at which the stroke locus experiences a drastic change. In this case, the process proceeds to Step S609, otherwise, the process advances to Step S611.

Figure 18:
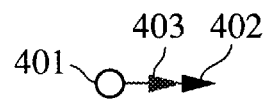
FIG. 18 is an illustration of a difference between absolute values of contiguous quasi-tangential vectors.

FIG. 18 shows, by way of example, lengths of vector information, i.e., the amounts of vector scalar amounts, of two pieces of vector information 402 and 403.

Other steps are not described because they are the same as those in the process shown in FIG. 9.

Figure 19:
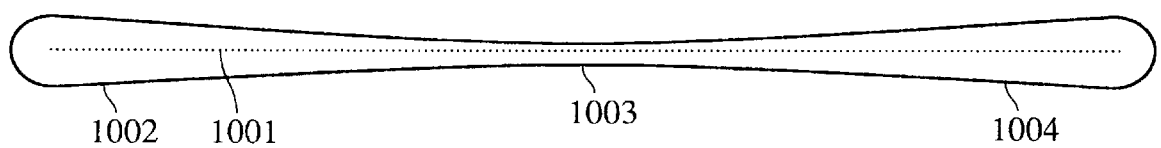
FIG. 19 is an illustration of processing performed by a host device based on vector information given for each coordinate point outputted from an information inputting device of the second embodiment, such that the magnitude of the vector information is represented by thickness or width of the line on a display.

FIG. 19 shows an example of reproduction of the locus information performed by the host device 109. In this case, the magnitude of the vector information added to each coordinates point is correlated to the thickness of the line reproduced and scribed by the host device 109. Using this function, it is possible to easily obtain such an application that, when a hair-pencil is used as the writing instrument, the reproduced line is thickened and thinned, respectively, at the regions where the hair-pencil is moved at low and high velocities, respectively.

Third Embodiment

In the first and second embodiments, the extraction of a characteristic point using quasi-tangential vectors relies upon the magnitude of the angle and the magnitude of change in the scalar amount between two successive pieces of vector information, respectively. In the third embodiment which will now be described, differential vector information is obtained from the two pieces of quasi-tangential vectors, and the scalar amount of this differential vector information is computed and compared with a predetermined threshold value. When this scalar amount computed on a certain point exceeds the threshold value, the coordinates values of this point are extracted as being the coordinates values of a characteristic point.

Figure 20:
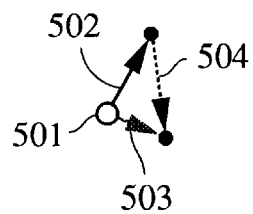
FIG. 20 is an illustration of a differential vector which is indicative of the difference between contiguous vectors, and which is used in an information inputting device of a third embodiment of the present invention.

Referring to FIG. 20, the differential vector, denoted by 504, is determined from the two pieces of vector information 502 and 503. It will be seen that the information concerning the angle formed between these two pieces of vector information, as well as the information concerning the difference in the length between these two pieces of vector information, is contained in the differential vector 504.

Figure 21:
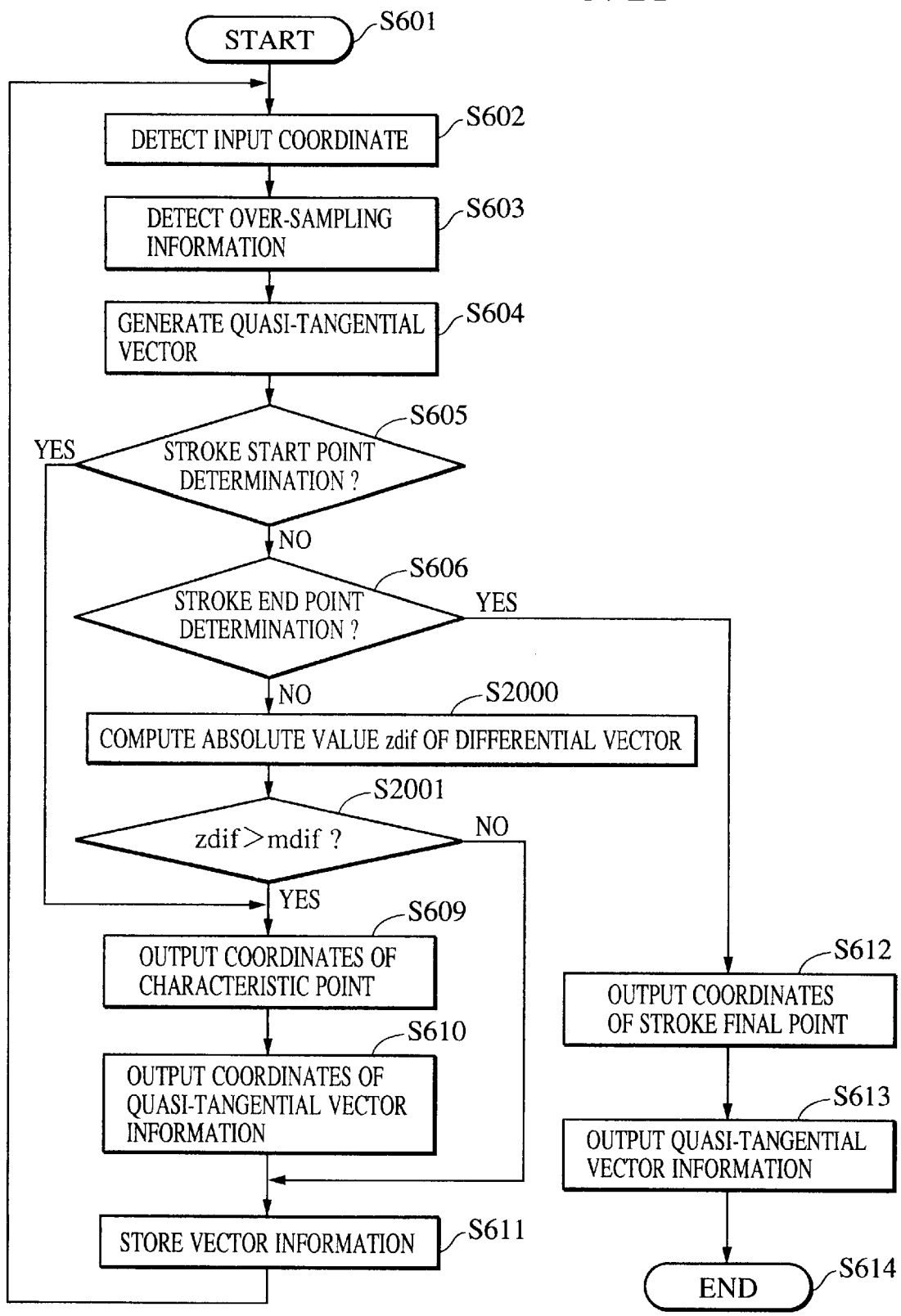
FIG. 21 is a flow chart showing a process performed by the information inputting device of the third embodiment.

FIG. 21 is a flow chart showing the process performed in the third embodiment of the present invention. The process shown in FIG. 21 is substantially the same as that of the first embodiment shown in FIG. 9, except for the points specifically mentioned below. The steps which are the same as those in the process shown in FIG. 9 are denoted by the same reference numerals as those used in FIG. 9.

Briefly, the process shown in FIG. 21 is discriminated from that shown in FIG. 9 in that Steps S607 and S608 in the process of FIG. 9 are replaced by Steps S2000 and S2001.

Step S2000 determines the differential vector between the quasi-tangential vector generated in Step S604 and the quasi-tangential vector which was generated immediately before this quasi-tangential vector, and determines the absolute value $Z_{dif}$ of the differential vector.

When the absolute value $Z_{dif}$ of the differential vector computed for a certain point exceeds a predetermined threshold $m_{dif}$, Step S2001 determines this point as being a characteristic point at which the stroke locus experiences a drastic change. In this case, the process proceeds to Step S609, otherwise, the process advances to Step S611.

Other steps are not described because they are the same as those in the process shown in FIG. 9.

According to the described arrangement, it is possible to reproduce change in the curvature of the locus information and change in the writing velocity by a single parameter, i.e., the length of the differential vector, whereby a higher processing speed is obtained for extraction of characteristic points.

In some cases, the host device connected to the information inputting device may require a greater degree of minuteness of the locus information. In order to meet such a requirement, it is necessary to alter the parameters used for the extraction of characteristic points. The third embodiment can easily meet the requirement because it employs only one parameter.

Figure 22:
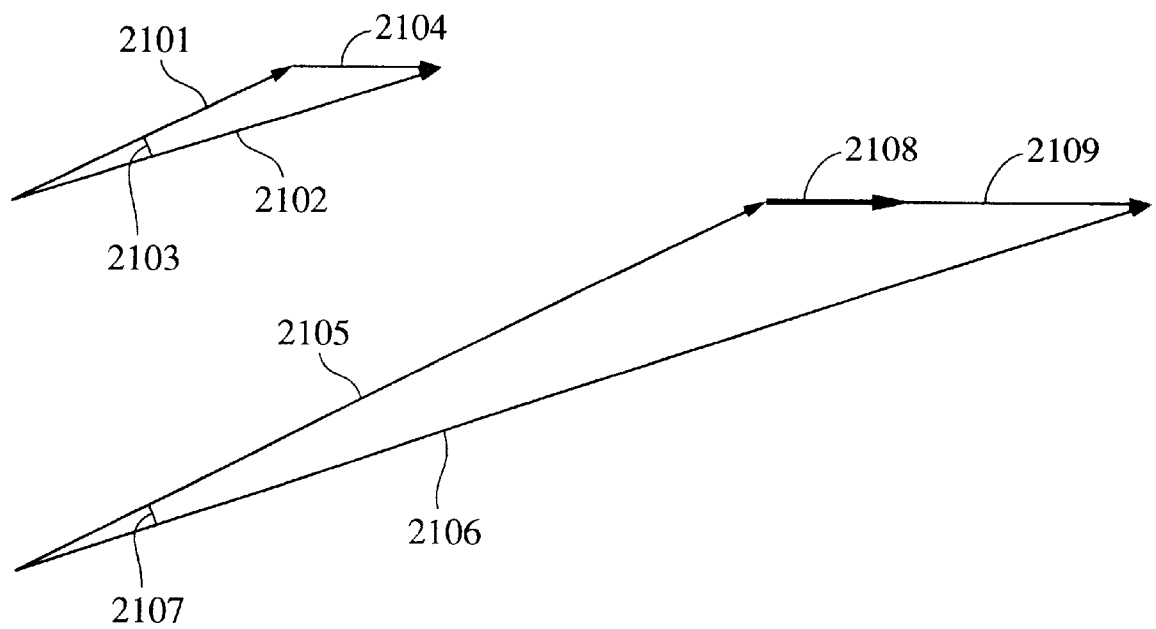
FIG. 22 is an illustration of the differential vectors used in the information inputting device of the third embodiment, explanatory of the meaning and significance of the differential vector.

Another advantage derived from the use of the absolute value of the differential vector for the purpose of extraction of characteristic point is as follows. Referring to FIG. 22, there are shown two pairs of consecutive vectors 2101, 2102 and 2105, 2106. Small angles 2103 and 2107 are formed between the vectors of the respective pairs. It will be seen that the magnitude of the differential vector 2109 as obtained when the vector scalar amount is large, i.e., when the writing velocity is high, is greater than that 2104 as obtained when the writing velocity is low, for a given threshold value with which the differential vector is to be compared. This means that the frequency of extraction of characteristic points is increased when the size of the written object is increased, thus offering a higher density of extraction of characteristic points in response to an increase in the writing speed.

Fourth Embodiment

In the first to third embodiments described above, characteristic points are extracted based on the quasi-tangential information alone. According to the present invention, however, it is possible to use, simultaneously with the extraction technique which uses the quasi-tangential vector information, other characteristic point extracting techniques, more specifically an extraction technique which uses the variation of the angle formed between consecutive coordinate series and an extraction technique which uses the number of coordinate points which have not been extracted as the characteristic points. By the simultaneous use of a plurality of characteristic point extraction techniques, it is possible to furnish the host device with more minute locus information.

Figure 23:
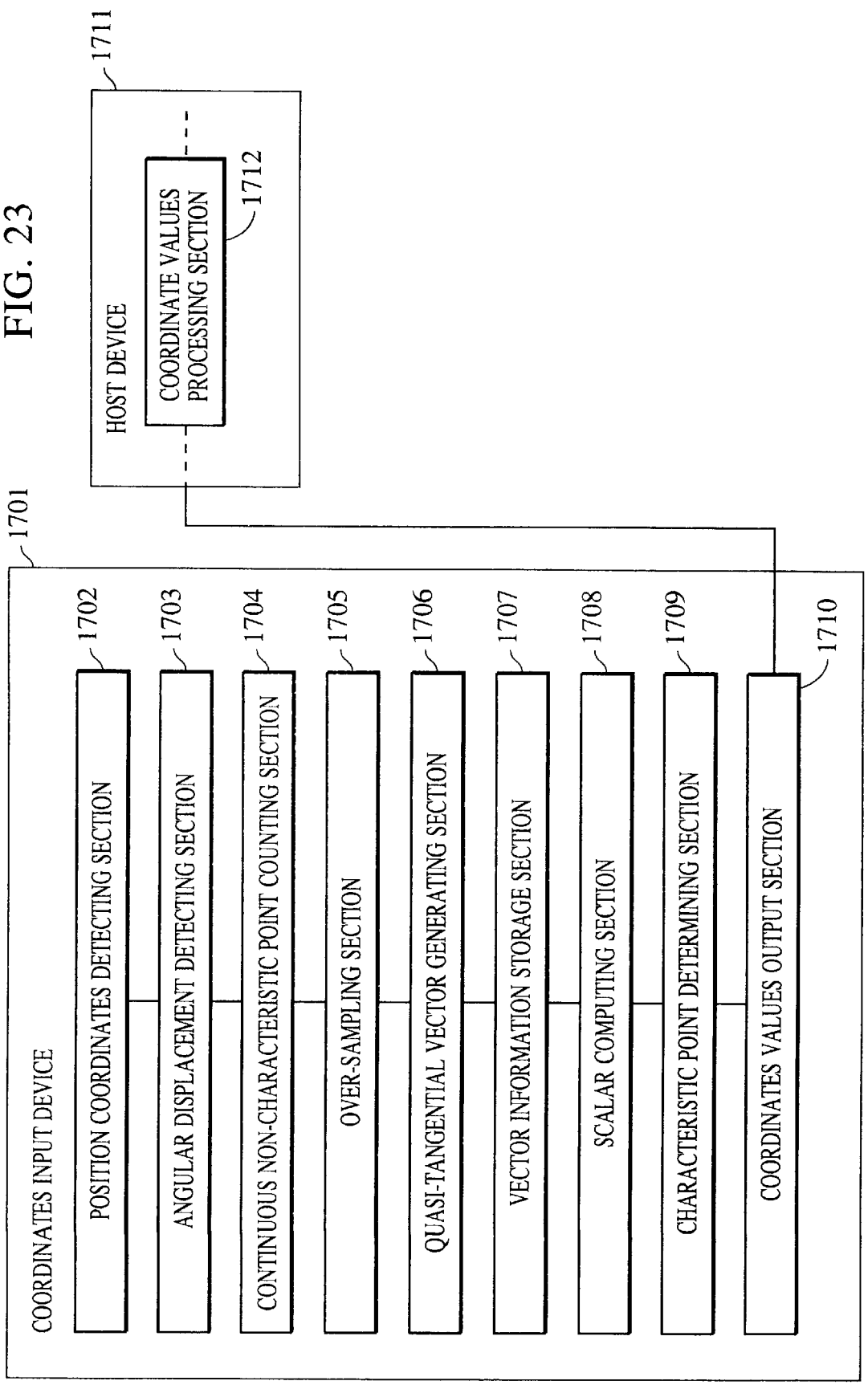
FIG. 23 is a schematic illustration of the structure of an information inputting device in accordance with a fourth embodiment of the present invention.

FIG. 23 shows the concept of the processing executed in the fourth embodiment of the present invention.

Referring to FIG. 23, a coordinates input device as the fourth embodiment of the information inputting device of the present invention is generally denoted by 1701. The internal structure of the coordinates input device is as follows. A position coordinates detecting section 1702 cyclically performs sampling at a predetermined period of time, so as to detect coordinates values. An angular displacement detecting section 1703 detects angular displacement between vectors which are determined by the contiguous coordinates values of the consecutive coordinates series. When the angular displacement detected on a certain coordinates point exceeds a predetermined threshold value, a characteristic point determining section determines that this point is a characteristic point.

Numeral 1704 denotes a consecutive non-characteristic point counting section for counting the number of consecutive coordinates point which have not been determined to be characteristic points. When the number counted by the counting section 1704 exceeds a predetermined threshold value, a characteristic point determining section 1709 determines such consecutive coordinate points as characteristic points.

Numerals 1705, 1706, 1707 and 1708 denote, respectively, an over-sampling section, quasi-tangential vector generating section, a vector information storage section and a scalar computing section. These sections perform the same processings as those described before. Namely, these sections perform over-sampling, generation of quasi-tangential vector, and determination of a scalar amount between adjacent quasi-tangential vectors. When the scalar amount thus determined on a certain coordinates point exceeds a predetermined threshold value, a characteristic point determining section 1709 determines this point as being a characteristic point.

The scalar computing section 1708 determines the differential vector between two vectors in the manner shown in FIG. 20, and computes the absolute value (scalar amount) of the differential vector.

The characteristic point determining section 1709 determines whether or not a coordinates point is a characteristic point, based on information given by each of the angular displacement detecting section 1703, the consecutive non-characteristic point counting section 1704 and the scalar computing section 1708.

A coordinates values output section 1710 serves to output the coordinates information of each point which has been determined by the characteristic point determining section as being a characteristic point.

A host device 1711 has a coordinates values processing section 1712 which performs various kinds of processing on the coordinate information furnished by the information inputting device.

The described arrangement makes it possible to incorporate extraction of a characteristic point based on the variation in the velocity of the input stroke, i.e., writing speed, as proposed by the invention, in addition to conventional techniques for extracting characteristic points, in various applications installed in the host device, such as handwritten pattern recognition engine, graphic application, and so forth.

The contents of the processing in the respective sections shown in FIG. 23 are described in corresponding processing programs which are stored in the ROM 202 and are executed by the CPU 200.

Fifth Embodiment

The fifth embodiment of the present invention employs an additional processing function which adaptively changes the threshold values used in the fourth embodiment for determination of characteristic points, thereby making it possible to efficiently furnish the host device with an optimum number of characteristic data.

The process performed in the fifth embodiment will now be described with reference to FIG. 24.

The contents of processing performed by the sections 1802, 1803, 1804, 1805, 1806, 1807, 1808, 1809 and 1810 are respectively the same as those performed by the sections 1702, 1703, 1704, 1705, 1706, 1707, 1708, 1709 and 1710 which are shown in FIG. 23 and, therefore, a detailed description is omitted in regard to this processing.

A description will be given of a threshold changing section 1811 which is incorporated in the fifth embodiment. The threshold changing section 1811 compares the scalar amount computed by the scalar computing section 1808 with a predetermined threshold value and, when the compute scalar amount exceeds the threshold value, increases the threshold value used in the characteristic point determining section 1809 which determines whether or not a point is a characteristic point based on the number of the points counted by the consecutive non-characteristic point counting section 1804. Conversely, when the computed scalar amount is smaller than the threshold value, the threshold changing section 1811 serves to reduce the threshold value. The threshold value thus changed is used as a new threshold value in the processing performed by the characteristic point determining section 1809.

According to the described arrangement, the operation for extracting characteristic points based on the number of the points counted by the consecutive non-characteristic counting section 1804 can be conducted in such a manner as to increase the ratio of thinning out, i.e., to pick up fewer characteristic points in the region where the writing velocity is high and to pick up a greater number of characteristic points in the region where the writing velocity is low, thus making it possible to efficiently reduce the number of the characteristic points to be furnished to the host device.

Figure 24:
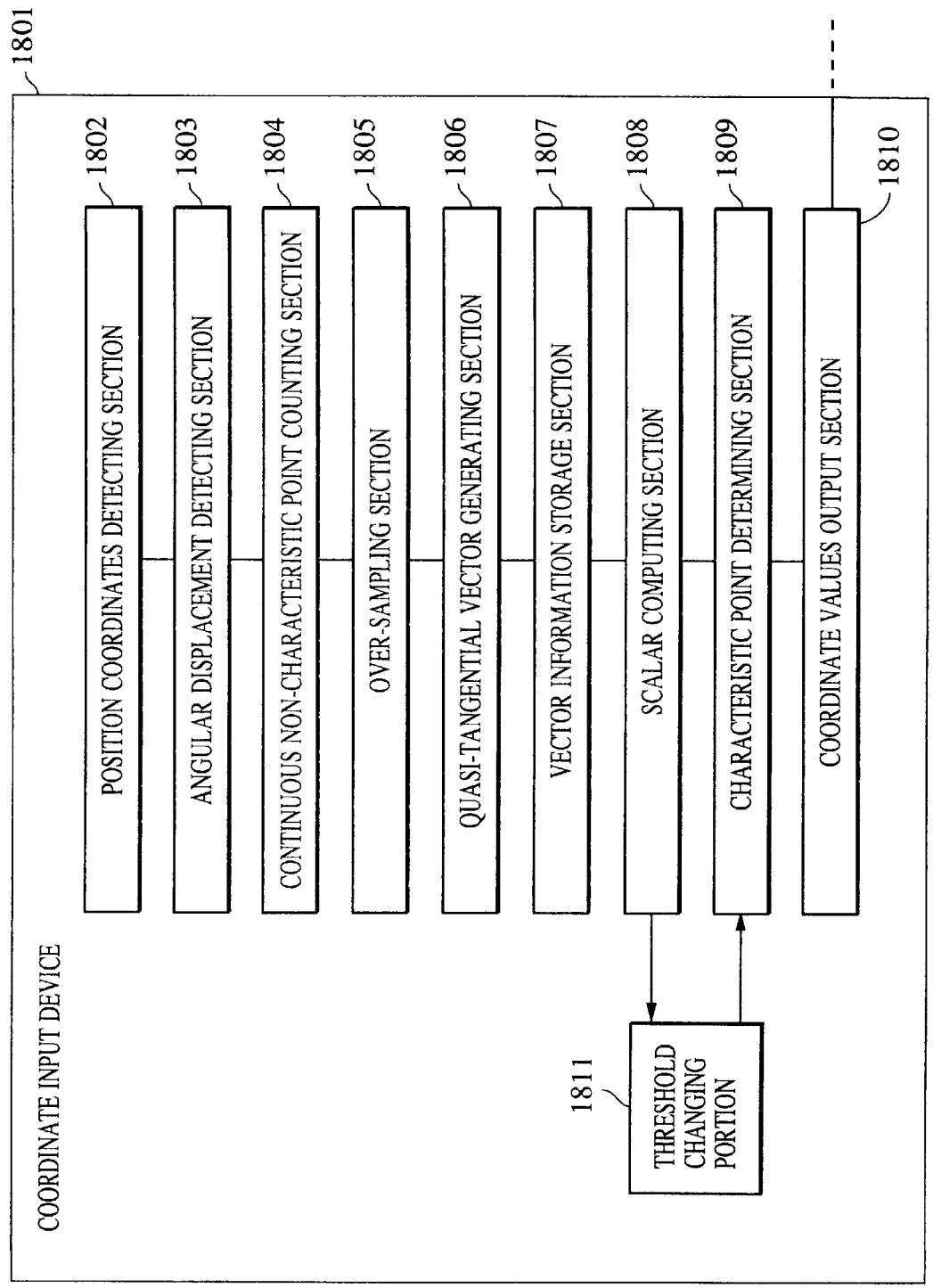
FIG. 24 is a schematic illustration of the structure of an information inputting device in accordance with a fifth embodiment of the present invention.

The contents of the processing performed by the respective sections shown in FIG. 24 are described in corresponding processing programs which are stored in the ROM 202 and are executed by the CPU 200.

The information inputting method, as well as apparatus, of the present invention may be applied both to a system which is constituted by a plurality of devices and a system which is constituted by a single device.

Although in the described embodiments various processing functions are performed by hardware structures, it will be understood that the object of the present invention can equally be achieved by means of software. That is to say, the invention may be carried out by supplying a system or an apparatus with a storage medium which stores program codes of software implementing various processing functions described before, and reading and executing such processing functions by a computer, e.g., a CPU or an MPU, incorporated in the system or the apparatus.

In such a case, the program codes read from the storage medium implement the described processing functions employed in the embodiments described before, so that the storage medium which stores the program codes is an embodiment of the present invention.

Various types of storage media can be used for this purpose, such as floppy disks, hard disks, optical disks, magneto-optical disks, CD-ROMs, CD-Rs, magnetic tapes, non-volatile memory cards, ROMs and so forth.

The invention may be carried out in such a manner that, not only the processing functions described before are implemented by a computer which reads and executes the program codes, but also an OS (Operating System) working on the computer undertakes part or whole of the processing in accordance with instructions given by the program codes, so as to implement the processing functions. Obviously, this manner of implementation falls within the scope of the present invention.

The invention also may be carried out in such a manner that the program codes read from the storage medium are written in a memory provided in a function extension board inserted into the computer or a function extension unit connected to the computer, and a suitable device such as a CPU provided in the extension board or extension unit performs part or whole of the processing in accordance with instructions given by the program codes, so as to implement the processing functions of the embodiments described before. Obviously, this manner of implementation also falls within the scope of the present invention.

Figure 25:
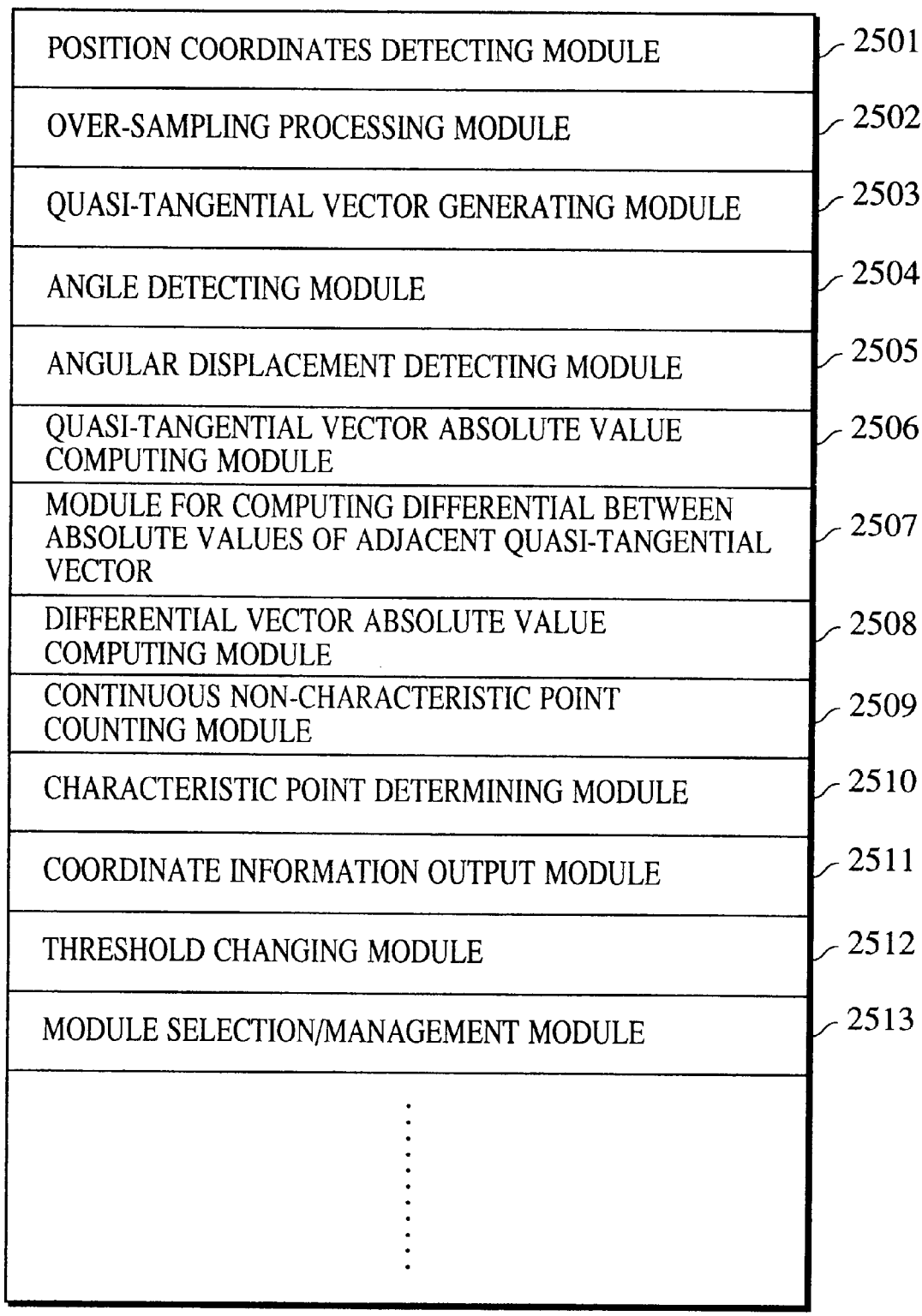
FIG. 25 is an illustration of an example of a layout of program modules stored in a storage medium which control processing to be performed by the information inputting devices of the respective embodiments.

When the present invention is applied to a storage medium of the type described above, the storage medium stores the program codes which correspond to each of the processes described before with reference to the flow charts. Briefly, various modules shown in a memory map of FIG. 25 are stored in the storage medium.

More specifically, the storage medium stores, at least: a position coordinates detecting module 2501 which performs sampling of points on the inputted stroke at a predetermined interval so as to detect coordinates values of these points; an over-sampling processing module 2502 which detects coordinates values at a moment which lags a predetermined short time behind the moment of detection by the position coordinates detecting module; a quasi-tangential vector generating module 2503 which determines a quasi-tangential vector based on the coordinates values of two inputted points which are close to each other; an angle detecting module 2504 for determining the angle formed between two contiguous quasi-tangential vectors; an angular displacement detecting module 2505 which performs processing for determining the difference between contiguous angles as determined by the angle detecting module; a quasi-tangential vector absolute value computing module 2506 which performs processing for determining the absolute value of the determined quasi-tangential vector; a module 2507 for determining the difference between the absolute values of two contiguous quasi-tangential vectors; a differential vector absolute value computing module 2508 for determining the absolute value of the differential vector between two contiguous quasi-tangential vectors; a continuous non-characteristic point counting module 2509 which counts the number of consecutive points which have not been selected as characteristic points; a characteristic point determining module 2510 for determining a characteristic point based on various kinds of computed information; a coordinates information output module 2511 for furnishing a host device with coordinates information concerning each point which has been determined as being a characteristic point; a threshold changing module 2512 which performs processing for adaptively changing the threshold level for the determination of characteristic points based on the magnitude of the absolute value of the differential vector between contiguous quasi-tangential vectors; and a module selection/management module 2513 which selects the modules in accordance with one of the embodiments described before and sequentially executes the contents of the selected modules.

As will be understood from the foregoing description, this embodiment of the present invention extracts coordinates values of any characteristic point at which the speed of free-hand writing input is changed, based on data acquired through computation on contiguous quasi-tangential vectors. It is therefore possible to efficiently produce effective coordinates data, without producing any data which are not so effective. Upon receipt of the data outputted from the information inputting device, a command information processing apparatus performs processing such as on-line hand-written pattern recognition, gesture command recognition on pen-inputted information, and so on, with higher degrees of efficiency and accuracy than before.

Thus, the present invention makes it possible to extract effective characteristic points from inputted stroke information and to output coordinate information concerning the extracted characteristic points.

While particular embodiments of the invention have been shown and described, various modifications will be apparent to those skilled in the art. Therefore, it is not intended that the invention be limited to the disclosed embodiments or to the details thereof and departures may be made therefrom within the spirit and scope of the invention.

What is claimed is:

1. An information inputting method, comprising:
 a first inputting step in a sampling cycle for inputting first point coordinate values at a predetermined sampling rate;
 a second inputting step in the sampling cycle for inputting second point coordinate values, said second input step being executed a predetermined time after execution of the first inputting step;
 a selecting step including determining a first vector based on the first point coordinates values inputted in said first inputting step and the second point coordinates values inputted in said second inputting step, determining a second vector based on the first and second point coordinates values inputted in the first and second inputting steps of a subsequent sampling cycle, and selecting the first point coordinate values which have been inputted in said first inputting step that cause an angle formed between said first and second vectors to exceed a predetermined threshold value; and
 an outputting step for outputting information of the first point coordinate values selected in said selecting step.

2. An information inputting method according to claim 1, wherein said predetermined time is very short compared with the sampling cycle which is determined based on said predetermined sampling rate.

3. An information inputting method according to claim 1, wherein said information of the first point coordinate values includes, in addition to the first point coordinate values, information concerning the first vector which starts from a position of said first point coordinate values.

4. An information inputting method according to claim 1, wherein said information of the first point coordinate values further includes status information of the status of an input device in regard to said first point coordinate values.

5. An information inputting method, comprising:
 a first inputting step in a sampling cycle for inputting first point coordinate values at a predetermined sampling rate;
 a second inputting step in the sampling cycle for inputting second point coordinate values, said second inputting step being executed a predetermined time after execution of the first inputting step;
 a selecting step including determining an absolute value of a first vector which is determined based on the first point coordinates values inputted in said first inputting step and the second point coordinates values inputted in said second inputting step, determining an absolute value of a second vector which is determined based on the first and second point coordinate values inputted in the first and second inputting steps of a subsequent sampling cycle, and selecting the first point coordinate values which have been inputted in said first inputting step that cause a difference between said absolute values of said first and second vectors to exceed a predetermined threshold value; and
 an outputting step for outputting information of the first point coordinates values selected in said selecting step.

6. An information inputting method, comprising:
 a first inputting step in a sampling cycle for inputting first point coordinate values at a predetermined sampling rate;
 a second inputting step in the sampling cycle for inputting second point coordinate values, said second inputting step being executed a predetermined time after execution of the first inputting step;
 a selecting step including determining a first vector based on the first point coordinate values inputted in said first inputting step and the second point coordinate values inputted in said second inputting step, determining a second vector based on the first and second point coordinate values inputted in the first and second inputting steps of a subsequent sampling cycle, determining a differential vector between said first and second vectors, and selecting the first point coordinate values which have been inputted in said first inputting step that cause an absolute value of said differential vector to exceed a predetermined threshold value; and
 an outputting step for outputting information of the first point coordinates values selected in said selecting step.

7. An information inputting method, comprising:
 a first inputting step in a sampling cycle for inputting first point coordinate values at a predetermined sampling rate;
 a second inputting step in the sampling cycle for inputting second point coordinate values, said second inputting step being executed a predetermined time after execution of the first inputting step;

a selecting step including determining a first vector based on the first point coordinate values inputted in said first inputting step and the second point coordinate values inputted in said second inputting step, determining a second vector based on the first and second point coordinate values inputted in the first and second inputting steps of a subsequent sampling cycle, determining an angle formed between said first and second vectors, determining a third vector based on the first and second point coordinate values inputted in the first and second inputting steps of a sampling cycle next occurring after said subsequent sampling cycle, determining an angle formed between said second vector and said third vector, and selecting the first point coordinate values of said second vector which cause a difference between an angle formed between said first and second vectors and the angle formed between said second and third vectors to exceed a predetermined threshold value; and an outputting step for outputting information of the coordinate values selected in said selecting step.

8. An information inputting method according to any of claims 1, 5, 6 and 7, further comprising:

a counting step for counting a number of consecutive point coordinate values which have not been selected in said selecting step; and an additional outputting step for outputting, when the number counted in said counting step exceeds a predetermined value, information of the most current point coordinate values among those which have not been selected in said selecting step.

9. An information inputting method according to claim 6, further comprising:

threshold changing step which, when the absolute value of said differential vector is equal to or greater than a threshold value, increases a level of the threshold used in the selection performed in said selecting step and, when the absolute value of said differential vector is smaller than said threshold value, lowers the level of the threshold used in the selection performed in said selecting step.

10. An information inputting device, comprising:

first inputting means for inputting first point coordinate values in a sampling cycle at a predetermined sampling rate;

second inputting means for inputting second point coordinate values in the sampling cycle, the second point inputting being executed a predetermined time after execution of the first point inputting;

selecting means for determining a first vector based on the first point coordinate values inputted by said first inputting means and the second point coordinate values inputted by said second inputting means, determining a second vector based on the first and second point coordinate values inputted by the first and second inputting means in a subsequent sampling cycle, and selecting the first point coordinate values which have been inputted by said first inputting means that cause an angle formed between said first and second vectors to exceed a predetermined threshold value; and outputting means for outputting information of the first point coordinate values selected by said selecting means.

11. An information inputting device according to claim 10, wherein said predetermined time is very short compared with the sampling cycle which is determined based on said predetermined sampling rate.

12. An information inputting device according to claim 10, wherein said information of the first point coordinate values includes, in addition to the first point coordinate values, information of the first vector which starts from a position of said first point coordinate values.

13. An information inputting device according to claim 12, wherein said information of the first point coordinate values further includes status information concerning the status of the input device in regard to said first point coordinate values.

14. An information inputting device, comprising:

first inputting means for inputting first point coordinate values in a sampling cycle at a predetermined sampling rate;

second inputting means for inputting second point coordinate values in the sampling cycle, said second point inputting being executed a predetermined time after execution of the first point inputting;

selecting means for determining an absolute value of a first vector which is determined based on the first point coordinate values inputted by said first inputting means and the second point coordinate values inputted by said second inputting means, determining an absolute value of a second vector which is determined based on the first and second point coordinates values inputted by said first and second inputting means in a subsequent sampling cycle, and selecting the first point coordinate values which have been inputted by said first inputting means that cause a difference between said absolute values of said first and second vectors to exceed a predetermined threshold value; and outputting means for outputting information of the first point coordinates values selected by said selecting means.

15. An information inputting device, comprising:

first inputting means for inputting first point coordinate values in a sampling cycle at a predetermined sampling rate;

second inputting means for inputting second point coordinate values in the sampling cycle, the second point inputting being executed a predetermined time after execution of the first point inputting;

selecting means for determining a first vector based on the first point coordinate values inputted by said first inputting means and the second point coordinate values inputted by said second inputting means, determining a second vector based on the first and second point coordinate values inputted by said first and second inputting means in a subsequent sampling cycle, determining a differential vector between said first and second vectors, and selecting the first point coordinate values which have been inputted by said first inputting means that cause an absolute value of said differential vector to exceed a predetermined threshold value; and outputting means for outputting information of the first point coordinates values selected by said selecting means.

16. An information inputting device, comprising:

first inputting means for inputting first point coordinate values in a sampling cycle at a predetermined sampling rate;

second inputting means for inputting second point coordinate values in the sampling cycle, said second point inputting being executed a predetermined time after said first point inputting;

selecting means for determining a first vector based on the first point coordinate values inputted by said first inputting means and the second point coordinate values inputted by said second inputting means, determining a second vector based on the first and second point coordinate values inputted by said first and second inputting means in a subsequent sampling cycle, determining an angle formed between said first and second vectors, determining a third vector based on the first and second point coordinates values inputted by the first and second inputting means in a sampling cycle next after said subsequent sampling cycle, determining an angle formed between said second vector and said third vector, and selecting the first point coordinates values of said second vector which causes the difference between the angle formed between said first and second vectors and the angle formed between said second and third vectors exceeds a predetermined threshold value; and outputting means for outputting information of the coordinates values selected in said selecting means.

17. An information inputting device according to one of claims 10, 14, 15 and 16, further comprising:

counting means for counting a number of consecutive point coordinates values which have not been selected by said selecting means; and an additional outputting means for outputting, when the number counted by said counting means exceeds a predetermined value, information of the most current point coordinates values among those which have not been selected by said selecting means.

18. An information inputting device according to claim 15, further comprising:

threshold changing means which, when the absolute value of said differential vector is equal to or greater than the threshold value, increases a level of the threshold used in the selection performed by said selecting means and, when the absolute value of said differential vector is smaller than said threshold value, lowers the level of the threshold used in the selection performed by said selecting means.

19. A computer program product comprising a medium usable on a computer having program code means readable by said computer, said computer program product comprising:

computer-readable first program code means for inputting first point coordinate values in a sampling cycle at a predetermined sampling rate;

computer-readable second program code means for inputting second point coordinate values in the sampling cycle, the second point inputting being executed a predetermined time after execution of the first point inputting;

computer-readable third program code means for determining a first vector based on the first point coordinate values inputted by said first program code means and the second point coordinate values inputted by said second program code means, determining a second vector based on the first and second point coordinate values inputted by the first and second program code means in a subsequent sampling cycle, and selecting the first point coordinate values which have been inputted by said first program code means that cause an angle formed between said first and second vectors to exceed a predetermined threshold value; and computer-readable fourth program code means for outputting information of the first point coordinate values selected by said third program code means.

20. A computer program product comprising a medium usable on a computer having program code means readable by said computer, said computer program product comprising:

computer-readable first program code means for inputting first point coordinate values in a sampling cycle at a predetermined sampling rate;

computer-readable second program code means for inputting second point coordinate values in the sampling cycle, said second point inputting being executed a predetermined time after said first point inputting;

computer-readable third program code means for determining an absolute value of a first vector which is determined based on the first point coordinate values inputted by said first program code means and the second point coordinate values inputted by said second program code means, determining an absolute value of a second vector which is determined based on the first and second point coordinate values inputted by said first and second program code means in a subsequent sampling cycle, and selecting the first point coordinate values which have been inputted by said first program code means that cause the difference between said absolute values of said first and second vectors to exceed a predetermined threshold value; and computer-readable fourth program code means for outputting information of the first point coordinate values selected by said third program code means.

21. A computer program product comprising a medium usable on a computer having program code means readable by said computer, said computer program product comprising:

computer-readable first program code means for inputting first point coordinate values in a sampling cycle at a predetermined sampling rate;

computer-readable second program code means for inputting second point coordinate values in the sampling cycle, said second point inputting being executed a predetermined time after execution of the first point inputting;

computer-readable third program code means for determining a first vector based on the first point coordinate values inputted by said first program code means and the second point coordinate values inputted by said second program code means, determining a second vector based on the first and second point coordinate values inputted by said first and second program code means in a subsequent sampling cycle, determining a differential vector between said first and second vectors, and selecting the first point coordinates values which have been inputted by said first program code means that cause the absolute value of said differential vector to exceed a predetermined threshold value; and computer-readable fourth program code means for outputting information of the first point coordinates values selected by said third program code means.

22. A computer program product comprising a medium usable on a computer having program code means readable by said computer, said computer program product comprising:

computer-readable first program code means for inputting first point coordinate values in a sampling cycle at a predetermined sampling rate;

computer-readable second program code means for inputting second point coordinate values in the sampling cycle, said second point inputting being executed a predetermined time after the first point inputting;

computer-readable third program code means for determining a first vector based on the first point coordinate values inputted by said first program code means and the second point coordinate values inputted by said second program code means, determining a second vector based on the first and second point coordinate values inputted by said first and second program code means in a subsequent sampling cycle, determining an angle formed between said first and second vectors, determining a third vector based on the first and second point coordinate values inputted by the first and second program code means in a sampling cycle next after said subsequent sampling cycle, determining an angle formed between said second vector and said third vector, and selecting the first point coordinate values of said second vector which cause a difference between the angle formed between said first and second vectors and the angle formed between said second and third vectors to exceed a predetermined threshold value; and computer-readable fourth program code means for outputting information of the coordinates values selected by said third program code means.

* * * * *

UNITED STATES PATENT AND TRADEMARK OFFICE
CERTIFICATE OF CORRECTION

PATENT NO. : 5,933,149
DATED : August 3, 1999
INVENTOR(S) : Shigeki Mori, et al.

It is certified that error appears in the above-identified patent and that said Letters Patent is hereby corrected as shown below:

Column 6,
Line 10, "is" should be deleted.

Column 10,
Line 44, "point" should read -- points --.

Signed and Sealed this

Sixteenth Day of October, 2001

Attest:

NICHOLAS P. GODICI
Attesting Officer   Acting Director of the United States Patent and Trademark Office